(12) United States Patent
Schneidmiller et al.

(10) Patent No.: US 8,484,887 B2
(45) Date of Patent: Jul. 16, 2013

(54) MULTI-SPECIES INSECT TRAP WITH SEPARATED PLUMES

(75) Inventors: Rodney G. Schneidmiller, Greenacres, WA (US); Qing-He Zhang, Spokane Valley, WA (US)

(73) Assignee: Sterling International Inc., Spokane, WA (US)

( * ) Notice: Subject to any disclaimer, the term of this patent is extended or adjusted under 35 U.S.C. 154(b) by 466 days.

(21) Appl. No.: 12/959,272

(22) Filed: Dec. 2, 2010

(65) Prior Publication Data

US 2011/0067293 A1    Mar. 24, 2011

Related U.S. Application Data

(63) Continuation-in-part of application No. 12/350,911, filed on Jan. 8, 2009, now Pat. No. 8,056,282, which is a continuation-in-part of application No. 12/200,820, filed on Aug. 28, 2008, now Pat. No. 8,051,600.

(60) Provisional application No. 61/013,936, filed on Dec. 14, 2007, provisional application No. 61/286,318, filed on Dec. 14, 2009.

(51) Int. Cl.
    *A01M 1/10*     (2006.01)
(52) U.S. Cl.
    USPC .............................................. 43/122; 43/133
(58) Field of Classification Search
    USPC .................................. 43/122, 133, 107, 132.1
    See application file for complete search history.

(56) References Cited

U.S. PATENT DOCUMENTS

| 38,277 A | 4/1863 | Basett |
| 149,918 A | 4/1874 | Clough |
| 218,175 A | 8/1879 | Hollingshead |
| 418,233 A | 12/1889 | Sallade |
| 836,052 A | 11/1906 | Pool |
| 862,079 A | 7/1907 | Lenthier |
| 1,131,120 A | 3/1915 | Crawford |
| 1,277,354 A | 9/1918 | Arabian |
| 1,544,334 A | 5/1923 | Martin |
| 3,059,373 A | 10/1962 | Gardner |
| 3,320,692 A | 5/1967 | Hellen |
| 3,885,341 A | 5/1975 | Kuchenbecker |
| 4,044,494 A | 8/1977 | Grajnert |
| 4,551,941 A | 11/1985 | Schneidmiller |

(Continued)

FOREIGN PATENT DOCUMENTS

| JP | 08-322448 A | 12/1996 |
| JP | 09-252700 A | 9/1997 |

*Primary Examiner* — Christopher P Ellis
(74) *Attorney, Agent, or Firm* — Christensen O'Connor Johnson Kindness PLLC

(57) ABSTRACT

An insect trap for targeting multiple species with an entrapment chamber having an entry structure attached to one end of the entrapment chamber and a lower lid closing a second end. The entry structure is configured to generate a first attractant plume, and includes an annular lid, a tapered guide, a plurality of members slidably engaging the lid, and an attachment fixture. The entry structure also has means for retaining a first attractant. The lower lid includes means for retaining a second attractant and a plurality of apertures, such that a second attractant plume may be generated that is spaced apart from the first attractant plume. The lower lid may include entry apertures to provide insect ingress to the entrapment chamber, and may further include a second tapered guide. The lower lid may alternatively comprise micropores that permit egress of the second attractant.

20 Claims, 11 Drawing Sheets

U.S. PATENT DOCUMENTS

| | | | |
|---|---|---|---|
| 4,873,787 A * | 10/1989 | Schneidmiller | 43/122 |
| 4,876,822 A | 10/1989 | White | |
| 5,392,560 A * | 2/1995 | Donahue et al. | 43/122 |
| 5,522,171 A * | 6/1996 | Mandeville | 43/122 |
| 5,557,880 A | 9/1996 | Schneidmiller | |
| 5,749,168 A * | 5/1998 | Chrysanthis | 43/122 |
| 6,158,165 A | 12/2000 | Wilson | |
| 6,289,629 B2 | 9/2001 | Greening | |
| 6,430,868 B1 * | 8/2002 | Plato et al. | 43/121 |
| 6,910,298 B2 | 6/2005 | Schneidmiller | |
| 7,310,907 B2 * | 12/2007 | Suteerawanit | 43/122 |
| 7,412,797 B1 | 8/2008 | Hiscox | |
| 8,056,282 B2 * | 11/2011 | Schneidmiller | 43/122 |
| 2005/0028429 A1 | 2/2005 | Schneidmiller | |
| 2005/0028430 A1 * | 2/2005 | Schneidmiller | 43/65 |
| 2005/0102888 A1 | 5/2005 | Curnow | |
| 2005/0279016 A1 * | 12/2005 | Williams et al. | 43/122 |
| 2007/0011940 A1 | 1/2007 | Chen | |
| 2007/0151142 A1 | 7/2007 | Suteerawanit | |
| 2009/0151227 A1 | 6/2009 | Schneidmiller | |
| 2009/0151228 A1 * | 6/2009 | Schneidmiller | 43/122 |
| 2012/0151822 A1 * | 6/2012 | Schneidmiller et al. | 43/107 |

* cited by examiner

MULTI-SPECIES INSECT TRAP WITH SEPARATED PLUMES

CROSS-REFERENCES TO RELATED APPLICATIONS

This application is a continuation-in-part of application Ser. No. 12/350,911, filed Jan. 8, 2009, which is a continuation-in-part of application Ser. No. 12/200,820, filed Aug. 28, 2008, which claims the benefit of Provisional Application No. 61/013,936, filed Dec. 14, 2007, the disclosures of each of which are hereby expressly incorporated by reference in their entirety. This application further claims the benefit of Provisional Application No. 61/286,318, filed Dec. 14, 2009, the disclosure of which is expressly incorporated by reference in its entirety.

BACKGROUND

Flying insects, for example, various social wasps, including paper wasps, hornets, and yellow jackets, can be a significant nuisance and a potential hazard to people and animals engaged in outdoor activities. Such flying insects can be prevalent in rural settings and even in very well-developed residential areas. Various species of insects, flying and otherwise, are also common in agricultural settings and in other commercial processing venues, including, for example, meat packing factories, food processing facilities, and livestock ranches.

Traps for flying insects are known in the art and often have been quite successful at trapping target insects. For example, the inventor of the insect trap disclosed herein pioneered conical element hanging traps, such as the wasp traps described and claimed in U.S. Pat. No. 4,551,941, which issued on Nov. 12, 1985, to Schneidmiller, and which is hereby incorporated by reference in its entirety. Schneidmiller discloses a transparent cylindrical insect trap that is selective to entrapping wasps. A "wasp" is a generic name applied to insects of the order Hymenoptera, which includes particularly paper wasps, hornets, and yellow jackets. The present inventor also discloses certain improvements to the insect trap in U.S. Pat. No. 5,557,880, which issued on Sep. 24, 1996, to Schneidmiller, also incorporated herein by reference in its entirety.

Previously patented trap structures include a transparent, generally cylindrical entrapment chamber that is open at the bottom, and a base that attaches to the bottom of the entrapment chamber and defines one or more entryways for the target insect. In the prior art device, the entrapment chamber also includes ventilation openings at the top end of the cylindrical entrapment chamber. The entryways in the base are apertures that permit and encourage wasps to enter the entrapment chamber. An entry cone shaped as a truncated cone or tapered guide is disposed in the entrapment chamber. The tapered guide is open at the bottom end, which is directly adjacent to the perimeter at the bottom of the entrapment chamber, and includes a smaller open aperture at the top end. Wasps or other target insects enter the trap through the entryways, and fly or climb into the cone, passing through the smaller aperture in its truncated upper end. The target insect thereby becomes entrapped in the cylindrical chamber. Once the target insect is inside the chamber, exiting is highly improbable.

Insect traps may use one or more attractants to lure target insects into the trap. The attractant may be as simple as water, or may be a chemical attractant that is targeted to a particular species. For example, the attractant may be an olfactory attractant for the target insect. The attractant may combine water with a volatile olfactory attractant, wherein the volatile olfactory attractant mixes with vapors from a chemical attractant and/or water in a separate container, the mixed vapors exiting the trap in a plume. An effective attractant plume will attract the target insects toward the trap, and in particular toward the trap entryway. Various attractants or combination of attractants may be used, including both solid and liquid attractants, providing great flexibility in selecting from a range and combination of attractants.

Portions of the trap may be colored and/or reflective to visually attract one or more target insects. Any such coloring may be selected to entice or attract a particular species of insect, providing a high degree of selectivity to the trap.

However, it is known that certain species of insects are territorial, and/or do not co-mingle. Members of a territorial insect species may be mutually or unilaterally antagonistic and/or repulsive toward other insect species. Sometimes mutually antagonistic species share a common environment (such as a residential yard, an orchard, a field, a wooded area, or the like) but avoid or repel each other when they come into close proximity. In such cases, conventional insect traps may be ineffective for one or more desired target species due to the close-proximity repulsion between target species.

It is also known that an attractant to one species of insect may be a repellant or inhibitory to another species, in some cases even when the species are relatively closely related, e.g., in the same family. Therefore, combining different attractants in order to target more than one species of insect may be ineffective or have significantly reduced efficacy because one target species may be repelled by an attractant targeted to different species.

However, it is inconvenient, costly, and/or unsightly to set out multiple traps (or multiple sets of traps) wherein different traps target different species of insects. Maintenance of a large multiplicity of traps, for example, emptying and replacing attractant, is also inconvenient and costly. There remains a need, therefore, for improvements in insect traps that are suitable for entrapping more than one species of insect.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

An insect trap is disclosed having an entrapment chamber, a first entry structure removably attached at one end of the chamber, and a perforated lid disposed at an opposite end of the chamber. The perforated lid may have apertures that are too small to serve as insect entryways, or may have apertures that define a second set of insect entryways. A small tapered guide and an attractant holder for a first insect attractant are disposed with the first entry structure. The perforated lid structure is configured to retain a second insect attractant. Therefore, a first attractant plume forms and emanates from the first entry structure, and a second attractant plume, spaced apart from the first plume, forms and emanates from the perforated lid structure.

In an embodiment, the first entry structure further includes an attachment fixture having an upper cap attached to a plurality of panels that slidably engage the upper lid of the first entry structure and are attached to the small tapered guide, and the attractant holder is a part of the small tapered guide.

In an embodiment, the perforated lid comprises a central recess that is configured to retain the second insect attractant, and a plurality of entry apertures that are sized to permit insect entry into the entrapment chamber and to release the second attractant vapor, and the trap further includes a large tapered guide having an open proximal end disposed adjacent the lower lid and an open distal end disposed in the entrapment chamber.

In an embodiment the perforated lid has a plurality of micropores, and a non-porous attractant compartment is disposed over the lid having an inverted cup portion and an outer flange portion.

An insect trap for trapping flying insects is disclosed having a hollow, tubular entrapment chamber with a first entry assembly comprising an annular lid with a central aperture, a first entry cone disposed below the annular lid, a plurality of panels attached to the first entry cone and extend outwardly through the central aperture, and a hanging fixture attached to the distal ends of the panels. The entry structure further defines means for retaining a first attractant. A perforated lower lid is removably attached to the second end of the chamber, and includes means for retaining and releasing a second attractant such that vapors from the first and second attractant can form attractant plumes that are completely separate at least near the trap.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Insect traps for flying insects are known in the prior art. See, for example, related U.S. Patent Publication No. 2009/0151228, which is hereby incorporated by reference in its entirety and U.S. patent application Ser. No. 12/052,663, filed on Mar. 20, 2008, which is also hereby incorporated by reference in its entirety.

Aspects of the present invention will now be discussed with reference to the figures, wherein like numbers indicate like parts.

Figure 1:
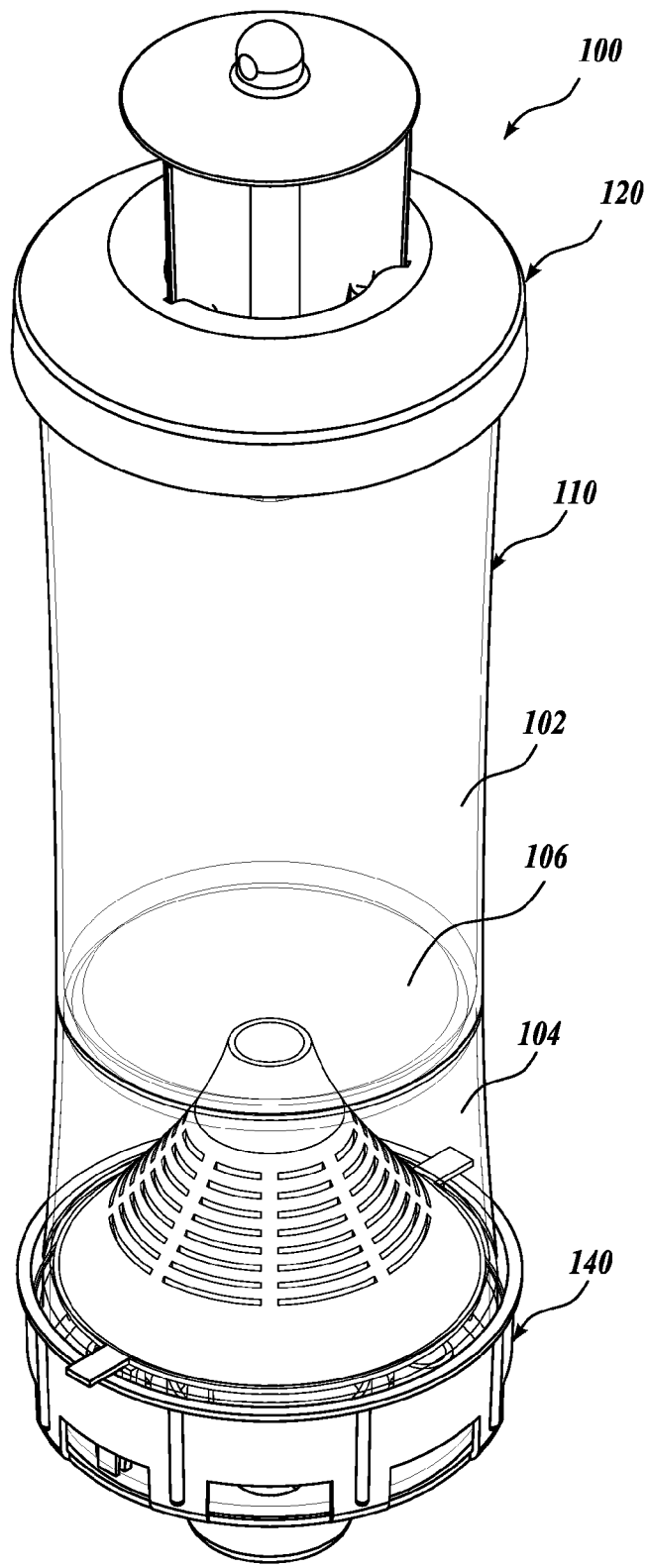
FIG. 1 is a perspective view of a first embodiment of a flying insect trap in accordance with the present invention.
Figure 2:
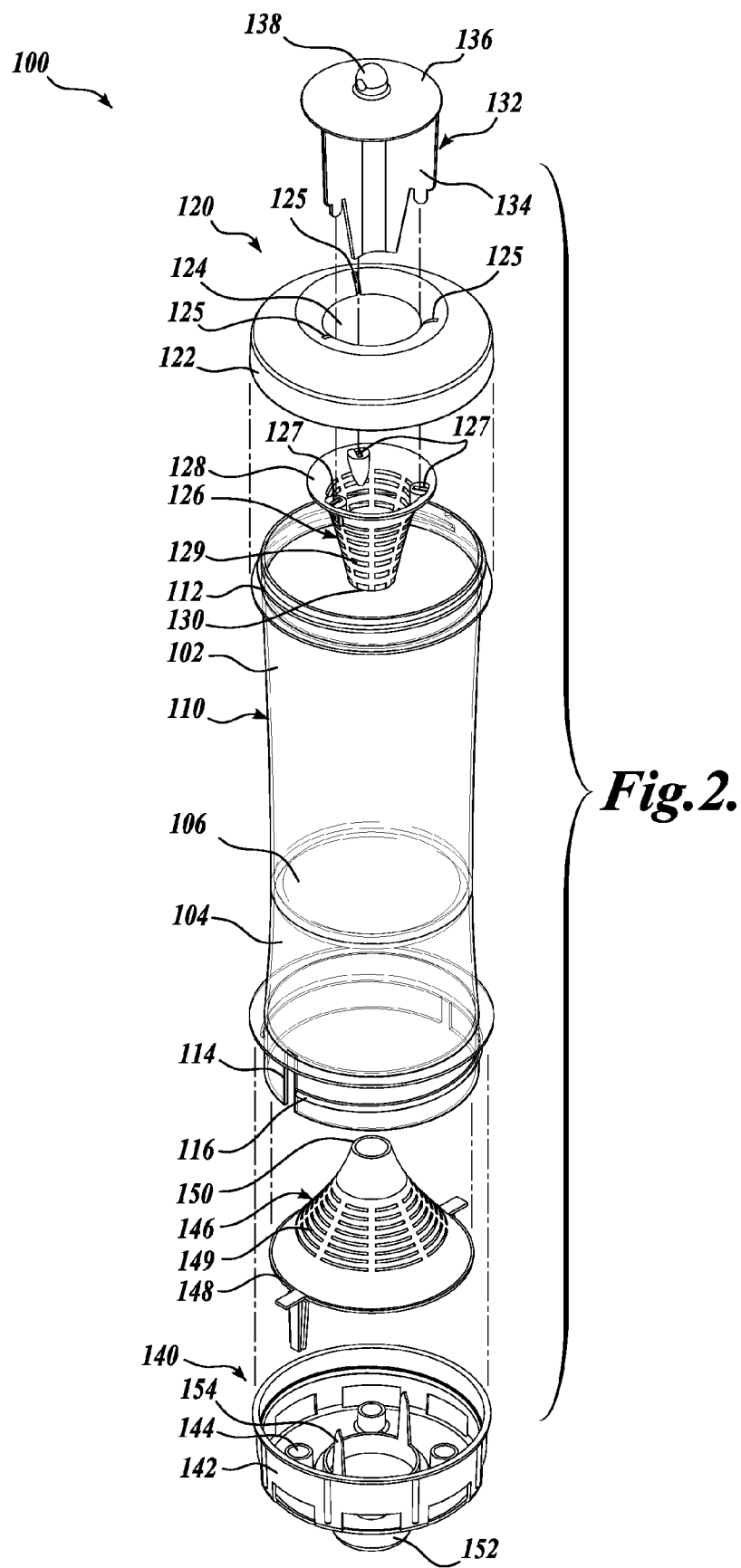
FIG. 2 is an exploded perspective view of the trap shown in FIG. 1.

A perspective view of an exemplary multi-species insect trap 100 in accordance with the present invention is shown in FIG. 1. An exploded view of the insect trap 100 is shown in FIG. 2. The insect trap 100 includes an entrapment chamber 110, which may preferably be transparent or translucent. The entrapment chamber 110 defines two or more separated compartments: in this embodiment, a first compartment 102 and a second compartment 104. The first and second compartments 102, 104 are separated by an internal transverse wall 106. Although a transparent entrapment chamber 110 is currently preferred and may be formed, for example, of a colored polymeric material, the entrapment chamber 110 may alternatively be translucent or opaque.

A first entry structure 120 is removably attached at a top end 112 of the entrapment chamber 110, providing insect access to the first compartment 102. The first entry structure 120 comprises a lid 122, a tapered guide 126, and an attachment fixture 132. The lid 122 attaches to the top end 112 of the entrapment chamber 110, for example, by threadable attachment or friction fit. The lid 122 has a central aperture 124 that is disposed directly over the open large end 128 of the cone-shaped tapered guide 126. The tapered guide 126 also has an open smaller distal end 130 that extends into the first compartment 102. The attachment fixture 132 includes a plurality of vertical panels 134 (three in this embodiment) that engage slots 125 in the lid 122 and lockingly engage the tapered guide 126 through attachment apertures 127, to hold the tapered guide 126 against the lid 122. Therefore, in this embodiment, the first entry structure 120 is assembled by positioning the tapered guide 126 under the lid 122 with the attachment apertures 127 directly below the lid slots 125, and pressing the attachment fixture 132 through the slots 125 and into the attachment apertures 127.

The attachment fixture 132 includes an upper cap portion 136 that is fixed to the top end of the vertical panels 134, and may include a hanging nib 138 to accommodate a string, strap, or the like, such that the trap 100 may be hung, for example, from a tree limb or building eave.

It will now be appreciated from the figures that the lid 122 and vertical panels 134 of the first entry structure 120 define three entryways into the tapered guide 126 and the first compartment 102. It is further contemplated that the first entry structure 120 may include a mechanism, such as an aperture, channel, opposed prongs, adhesive, bowl portion, or the like, for retaining an attractant to preferentially attract a particular species of insect.

A second entry structure 140 is removably attached at a bottom end 114 of the entrapment chamber 110, providing insect access to the second compartment 104. The second entry structure 140 comprises a threaded lower lid 142 that engages a thread 116 on the entrapment chamber 110. The lower lid 142 includes a plurality of entry apertures 144 (three visible). A second tapered guide 146 is disposed with an open larger end 148 abutting the lower lid 142, and a smaller open end 150 extending into the second compartment 104. The tapered guides 126 and 146 may include a plurality of apertures 129, 149, respectively, that are sized to provide target insects with a perch and a sensory indicator of open space, but are too small to permit the target insect to pass therethrough.

The lower lid 142 also includes a cup portion 152 that may be used to retain, for example, a liquid attractant such as water, water with a chemical attractant, or a chemical attractant with or without absorbent materials. In one embodiment, the attractant is a volatile attractant formed into a solid with a polyurethane matrix, such that the attractant will evaporate and escape from the matrix over a period of time. A retainer structure 154 comprising two upwardly extending prongs is also provided that may be used, for example, to hold a solid attractant (not shown), or the like. Although liquid and solid attractants are believed to be most common, it will be appreciated by persons of skill in the art that other forms of attractant, for example, semi-solid attractants (such as pastes or gels) or combinations thereof, may alternatively be used, and may be preferred for some applications. Of course various combinations of one or more of solid, liquid and other attractants may be utilized.

It will now be appreciated from the figures that the lower lid 142 entry apertures 144 define entryways into the second tapered guide 146 and the second compartment 104.

The trap 100 with the first entry structure 120 spaced apart from the second entry structure 140 provides longitudinally spaced entryways for trapping target insects in two separate compartments 102, 104. One or both of the entry structures 120, 140 may be provided with an attractant for target insects. If both of the entry structures 120, 140 retain an attractant, the attractants may be individually formulated and targeted to specific insects, whereby the trap may be used to entrap different species of insect.

In one embodiment, the entryways defined by the first entry structure 120 are spaced at least six inches from the second entry structure 140 apertures 144, and more preferably at least eight inches from the entry apertures 144. However, it will be appreciated by persons of skill in the art that the spacing of the entryways may be different, for example, the spacing may be selected based on the particular insects that are the intended targets of the trap, the particular attractant(s) intended to be used with the trap, and/or the intended location or mode for using the trap.

When separate attractants (for example, food attractants, kairomones, insect sex or aggregation pheromones, etc.) are provided in each of the compartments 102, 104, one plume will be produced by a first attractant at the first entry structure, and a second plume will emanate from a second attractant at the second entry structure 140. At least in the near vicinity of the trap 100 the two attractant plumes will be spatially separated, the first plume emanating from near the top of the trap 100, and the second plume emanating from near the bottom of the trap 100. Therefore, it is contemplated that the attractants may be selected such that a first target insect is preferentially attracted by the first plume to the first compartment 102, and a second target insect, which may be repulsed by the first attractant, is preferentially attracted by the second plume to the second compartment 104. Spatial separation of the two attractants by several inches to a foot or more, wherein one or both of the attractants may be behaviorally repulsive to a target species, might completely avoid or eliminate the potential loss of effectiveness resulting from any repellant effect of the attractants on other species. The spatial separation of the attractant plumes, therefore, may increase the trapping efficacy for multiple target insect groups. If the attractant plumes were not spaced apart at the trap entrances, for example, if a single mixed plume were generated, then the capture rate for all of the target insect groups may be reduced.

Of course, at some distance from the trap 100 the first and second plumes may mix and/or merge as they spread out due to convection and diffusion processes. However, the concentrations of the attractants reduce rapidly with distance from the trap. The concentration of the attractant is key to its attractant/repellant affect. Therefore, it is contemplated that at distances wherein the attractant plumes merge, the concentration of attractant will be sufficiently reduced as to avoid any significant repellant affect.

As the different species of target insects approach the trap 100, they will be preferentially attracted towards the desired attractant plume. In addition to their corresponding olfactory orientations to the separated attractant plumes, the live activities of trapped insects in either chamber may provide a visual attraction to same or other target insects entering the trap when they are in the near the trap. The trap 100 allows two or more attractant releasing sources and collection chambers in a single trap. The trap 100 also reduces or eliminates antagonistic effects between attractants (food attractants, kairomones, insect sex or aggregation pheromones) for multiple insect species by separating their corresponding attractant plumes; thus one trap can catch more than one target insect species, eliminating the need for multiple individual traps (e.g., one for each target species) that would be required to achieve the same efficacy.

The trap 100 provides for the combination of wet and dry traps in a single trap. For example, the first compartment 102 might be used as a wet trap, i.e., loaded with a certain amount of water, with or without attractants. The water itself can be either an attractant for some insects and/or a drowning agent. Water vapor may also function as a controlled release substrate for some water-dissolvable, highly volatile chemical attractant (e.g., short chain acids). The second compartment 104 might then be used as a dry trap, especially good for attractant chemicals that are heavier than air.

In one embodiment, an attractant generating a plume that is less dense (lighter) than air or neutrally buoyant is provided in the first compartment 102, and an attractant generating a plume that is more dense (heavier) than air is provided in the second compartment, such that the plumes will separate significantly near the trap 100 to further avoid any potential repellant effects from the attractant plumes.

Figure 3:
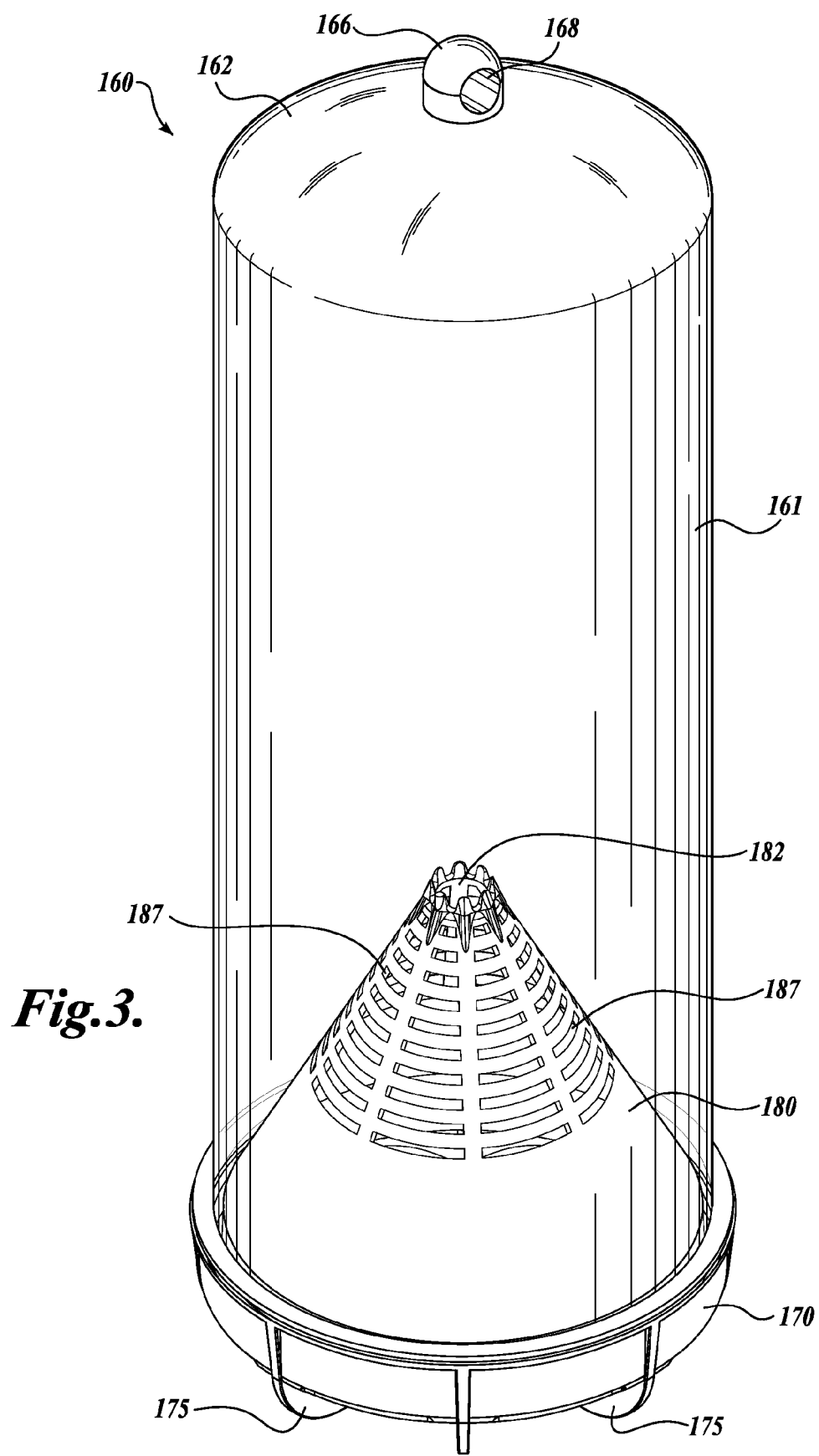
FIG. 3 is a perspective view of a second embodiment of a flying insect trap in accordance with the present invention.
Figure 4:
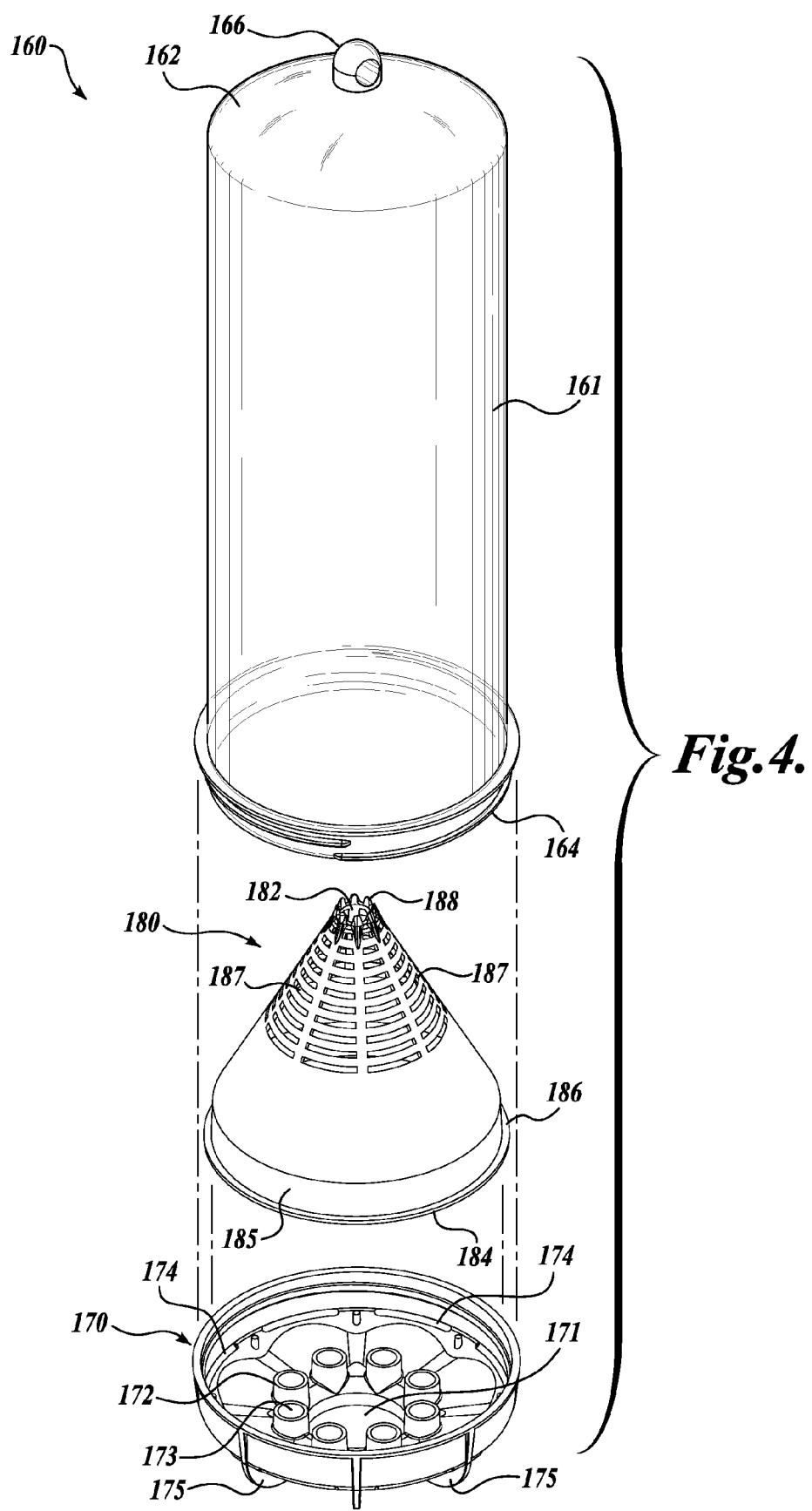
FIG. 4 is an exploded perspective view of the trap shown in FIG. 3.

FIG. 3 shows a perspective view of an insect trap 160 that is suitable for trapping flying insects. Refer also to FIG. 4, which shows an exploded view of the insect trap 160. The insect trap 160 has an entrapment chamber 161 that is closed at the top 162 and open at the bottom 164. An entry structure 170 is removably attached to the entrapment chamber 161. In a current embodiment, the entry structure 170 threadably engages the lower end 164 of the entrapment chamber 161. A hanging nib 166 defining a through-aperture 168 is shown at the top of the entrapment chamber 161, to facilitate hanging the trap 160.

A tapered guide 180 extends into the entrapment chamber 161 from the open bottom end 164 and is retained therein by the entry structure 170. The tapered guide 180 is shaped generally as a truncated cone, having a smaller open top end 182 and a larger open bottom end 184. In this embodiment, the guide 180 includes a lower, generally cylindrical portion 185 sized to fit snugly in the entrapment chamber 161, and an outwardly extending annular rim 186 that abuts the bottom of the entrapment chamber 161.

The tapered guide 180 may optionally include a plurality of apertures therethrough, which in this embodiment are generally elongate, rectangular slots. The apertures 187, which are preferably disposed near an upper end of the tapered guide 180, allow light to pass through, such that in suitable lighting the upper portion of the guide will be better illuminated, providing a sense of openness, and encouraging target insects to proceed into the tapered guide 180. The apertures 187 also provide a perch for such insects. A novel aspect of the tapered guide 180 is a crown structure 188 disposed at the open top end 182. The crown structure 188 comprises a plurality of upward extensions (eight shown) spaced about the open top end 182. The crown structure 188 tends to discourage or inhibit insects that have entered the entrapment chamber 110 through the tapered guide 180 from re-entering the tapered guide 180 and exiting the entrapment chamber 161.

The entry structure 170 attaches to the entrapment chamber 161, e.g., after the tapered guide 180 has been inserted into the open lower end 164. The entry structure 170 defines a central recess 171, which may be used, for example, to support or retain an attractant (not shown) for attracting one or more targeted insects. The attractant may be in liquid or solid form, and may be as simple as water, or a more complex organic or chemical attractant. A plurality of entryways 172 are defined in the entry structure 170. In this embodiment the entryways 172 comprise apertures 173 defined by upright tubular members. A plurality of slots 174 are spaced about the perimeter of the entry structure 170. The slots 174 provide an opening that allows attractant to exit the trap 160 to form a plume. The attractant may exit the trap 160 by diffusion, by pressure driven outflow resulting from changes in temperature in the entrapment chamber 161, and/or by convection or airflow initiated by external air entering the trap 160 from one or more of the slots 174. Of course, attractant may also exit the entryway apertures 173, wherein attractant from an entryway aperture 173 and slot 174 may cooperatively form the plume. The attractant plume tends to urge the target insects toward the trap 100, and specifically toward the trap entryways 172.

The bottom of the entry structure 170 defines a plurality of panels or fins 175 comprising radially oriented walls extending from the central recess structure 171 to the periphery of the entry structure 170. The fins 175 define a plurality of converging channels, each channel leading to one of the entryway apertures 173. The fins 175 are substantially planar, upright walls, although other configurations are clearly possible. The fins 175 provide several advantages. For example, the fins 175 separate neighboring entryway apertures 173, thereby reducing the opportunity for multiple insects arriving at the same time from interacting with each other. This allows the entryway apertures 173 to be located closer together without increasing insect interference. The fins 175 also guide the insects toward the aperture 173, thereby tending to encourage target insects to enter the trap through the entry aperture 173. Also, the fins 175 tend to guide and retain the attractant plume, to better entice the target insects into the trap 160.

Figure 5:
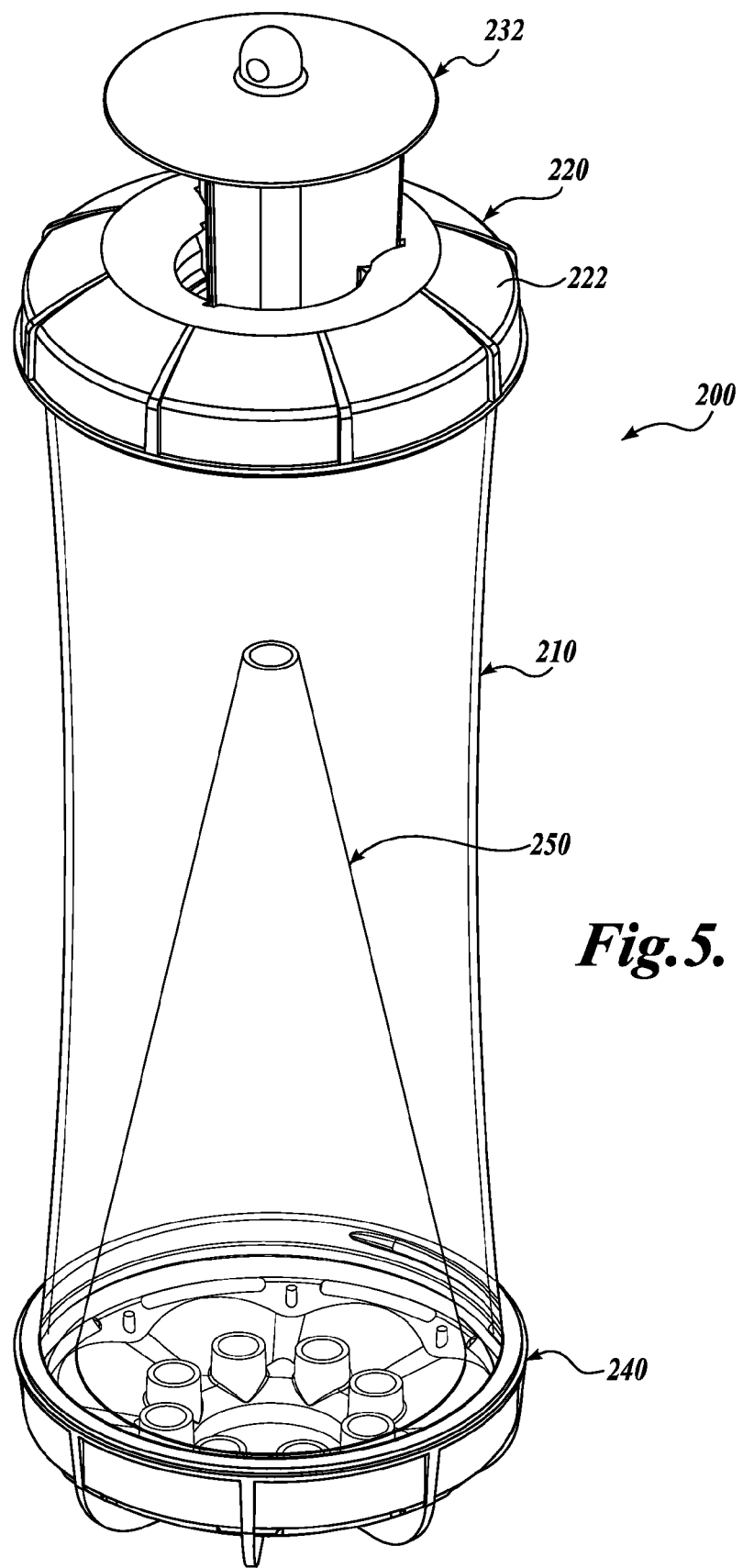
FIG. 5 is a perspective view of another embodiment of an insect trap in accordance with the teachings herein, having a single entrapment chamber and spaced-apart entries in accordance with the present invention.
Figure 6:
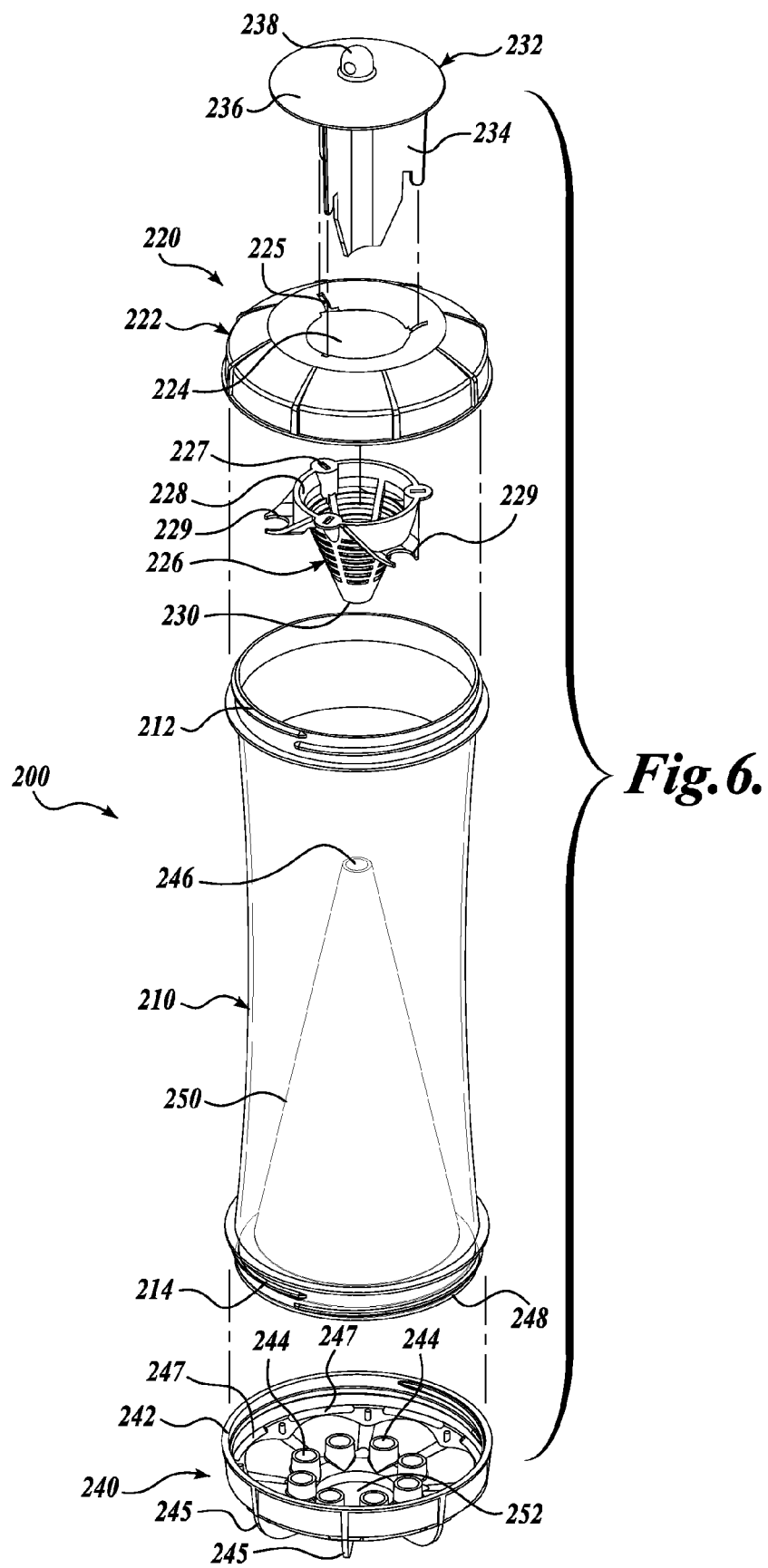
FIG. 6 is an exploded view of the insect trap shown in FIG. 5.
Figure 7:
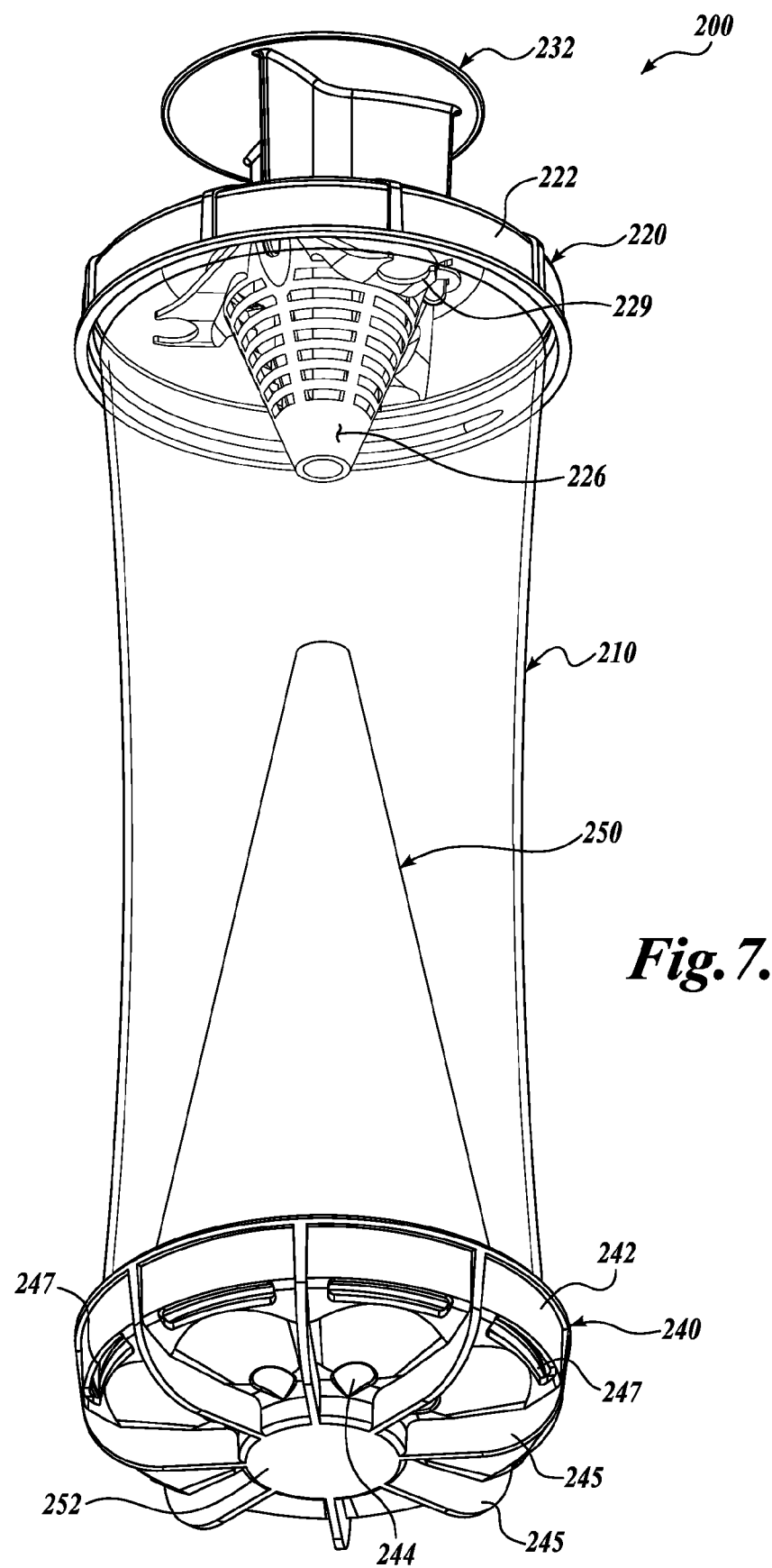
FIG. 7 is a perspective view of the insect trap shown in FIG. 5, showing a bottom portion of the trap.

FIG. 5 is a perspective view of another insect trap 200 in accordance with the present invention. FIG. 6 is a partially exploded view of the insect trap 200, and FIG. 7 is another perspective view of the insect trap 200, from a lower perspective. In this embodiment, the insect trap 200 includes an entrapment chamber 210 that is generally in the shape of a circular cylinder with open ends and formed with a waist or narrowed portion near the center. Of course, the entrapment chamber 210 may be shaped differently without departing from the present invention, for example, as a geometric cylinder. The entrapment chamber 210 may be transparent, translucent, or opaque, although a generally transparent chamber 210 is currently preferred. For example, the chamber 210 may be formed of a colored polymeric material.

A first entry structure 220 is removably attached at a first end 212 of the entrapment chamber 210, providing insect access to the entrapment chamber 210. The first entry structure shown in FIGS. 5-7 comprises an upper lid 222, a tapered guide 226, and an attachment fixture 232. The upper lid 222 attaches to the first end 212 of the entrapment chamber 210, for example, by threadable attachment or friction fit. The lid 222 has a central aperture 224 that is disposed directly over the open large end 228 of the inverted cone-shaped tapered guide 226. The tapered guide 226 also has an open smaller distal end 230 that extends into the entrapment chamber 210.

The attachment fixture 232 includes a plurality of panels 234 (three in this embodiment) that engage slots 225 in the lid 222 and lockingly engage the tapered guide 226 through attachment apertures 227. The attachment fixture 232 includes an upper cap portion 236 that is fixed to the panels 234, and may include a hanging nib 238 to accommodate a string, strap, or the like, such that the trap 200 may be hung, for example, from a tree limb or building eave.

A plurality of attractant holders 229 are formed in the tapered guide 226. In this embodiment the attractant holders 229 comprise generally C-shaped openings peripherally disposed and sized to receive and retain a vial, or the like, containing an attractant (not shown). However, it will be appreciated that any suitable attractant-retaining structure may alternatively be used, including, for example, an adhesive attachment, one or more hooks that engage the tapered guide 226, attractant formed integrally with or embedded in the tapered guide 226 or other portions of the entry structure 220, or the like. It is further contemplated that the first entry structure 220 may additionally or alternatively include attractant retaining mechanisms such as a channel, opposed prongs, bowl portion, or the like.

The first entry structure 220 is assembled in a manner similar to the entry structure 120 described above.

The lid 222 and vertical panels 234 of the first entry structure 220 define three entryways into the tapered guide 226 and the entrapment chamber 210. It will now be appreciated that the attachment fixture 232 slidably engages the lid 222, and can be slidably moved between a first position, wherein the cap portion 236 substantially covers the lid central aperture 224, and a second position, wherein the tapered guide 226 is disposed generally against the lid 222, and the entryways to the entrapment chamber 210 are open.

A second entry structure 240 is removably attached at a second end 214 of the entrapment chamber 210, providing insect access to entrapment chamber 210. Although various entry structures may be used in the present invention, a currently preferred second entry structure is similar to the entry structure 170 described above, and comprises a lower lid 242 having a plurality of entry apertures 244, a central recess portion 252, a plurality of peripheral apertures 247 spaced about near the lower perimeter of the lower lid 242, and a plurality of fins 245 defining converging channels leading to one of the entry apertures 244.

The recess portion 252 may be used to retain, for example, a liquid attractant such as water, water with a chemical attractant, or chemical attractant alone. Although liquid and solid attractants are believed to be most common, it will be appreciated by persons of skill in the art that other forms of attractant, for example, semi-solid attractants (such as pastes or gels) or combinations thereof, may alternatively be used, and may be preferred for some applications. Of course, various combinations of one or more of solid, liquid, and other attractants may be utilized. Although the recess portion 252 is currently preferred, it is contemplated that other attractant retention structures may alternatively or additionally be provided. For example, the lower lid 242 may comprise an aperture adapted to receive and lockingly engage an attractant cartridge, and/or may include a vial support structure to releasably retain vials or vial-shaped attractants. In one embodiment, the attractant is a volatile attractant formed into a solid with a polyurethane matrix, such that the attractant will evaporate and escape from the matrix over a period of time. Other attractant retention mechanisms will be readily apparent to persons of skill in the art.

A large tapered guide 250 is disposed with an open end 248 abutting the second end 214 of the entrapment chamber 210 and a smaller open end 246 extending most of the way through the entrapment chamber 210. In the current embodiment the large tapered guide 250 is affixed to the second end 214 of the entrapment chamber 210, for example, with an adhesive or by heat bonding. In a current embodiment the tapered guide 250 is formed to permit light to pass therethrough, for example, using a transparent material. In this embodiment the tapered guide 250 does not have an array of apertures therethrough, in order to reduce or minimize the amount of attractant associated with the second entry structure 240 from entering the entrapment chamber 210 and mixing with attractant associated with the first entry structure 220.

The plurality of peripheral apertures 247 near the lower perimeter of the lower lid 242 are located below the second end 214 of the entrapment chamber 210 such that they are not blocked by either the entrapment chamber 210 or the tapered guide 250. The peripheral apertures 247 are oriented at least partially outwardly, such that airflow through the trap 210 may be generated by local breezes, and the like, thereby encouraging the development and transport of a plume of the attractant in the trap 200.

The trap 200 is configured to support two spaced-apart attractants that may be deployed to attract insects to the single entrapment chamber 210. It will be readily apparent to persons of skill in the art, and it is contemplated by the present disclosure, that more than two spaced-apart attractants may be provided in a single entrapment chamber. For example, different attractants may be effective for attracting different species of flying insects, or may be effective for attracting different members within a particular species. The attractants may be solid(s), liquid(s), gel(s), powder(s), or the like, to produce a plume, such as an olfactory or other chemical concentration in air. Such attractants are known in the art. In one embodiment, the attractant is a volatile attractant formed into a solid with a polyurethane matrix, such that the attractant will evaporate and escape from the matrix over a period of time.

The trap 200 provides the functionality to produce two separated plumes of attractants, i.e., one from the first entry structure 220 and another from the second entry structure 240.

The trap 200 provides longitudinally spaced entry structures 220, 240 for trapping target insects in the single entrapment chamber 210. One or both of the entry structures 220, 240 may include attractant for target insects. If both of the entry structures 220, 240 include an attractant, the attractants may be individually formulated and targeted to specific insects. Therefore, the trap 200 may be used to entrap different species of insect.

In one embodiment the entryways defined by the first entry structure 220 are spaced at least six inches from the second entry structure 240 apertures 244, and more preferably at least eight inches from the entry apertures 244. However, it will be appreciated by persons of skill in the art that the spacing of the entryways may be different, for example, the spacing may be selected based on the particular insects that are the intended targets of the trap, the particular attractant(s) intended to be used with the trap, and/or the intended location or mode for using the trap.

The separation of the two plumes, for example, by six inches or more, should eliminate the repellant effect on the different species. In particular, it is believed that any mixing between the top and bottom attractants within the entrapment chamber 210 will be too low to have any significant effect, due to the small size of the opening in the smaller open end 246. Mixing of the two attractants will be further inhibited or avoided if the top attractant is lighter (less dense) than the bottom attractant. At a distance significant distance from the trap 200, of course, the two plumes may mix and/or merge due to convection and diffusion processes. However, the concentrations of the different attractants will drop off rapidly with distance, such that any repellant effects will not be significant.

It is believed that certain insect species have an innate curiosity, and this curiosity may draw such species into the entrapment chamber if they are attracted to the near vicinity of the trap 200. For example, certain insects in very close proximity to the trap 200 may be aroused to enter the trap due to visual or auditory cues, for example, cues generated by insects already in the trap 200, independently of any semiochemical attractant. An advantage of having an entrapment chamber 210 with a single compartment is ease of manufacture and simplicity in emptying the trap (i.e., removal of captured insects) in comparison to a trap with multiple entrapment chambers.

Figure 8:
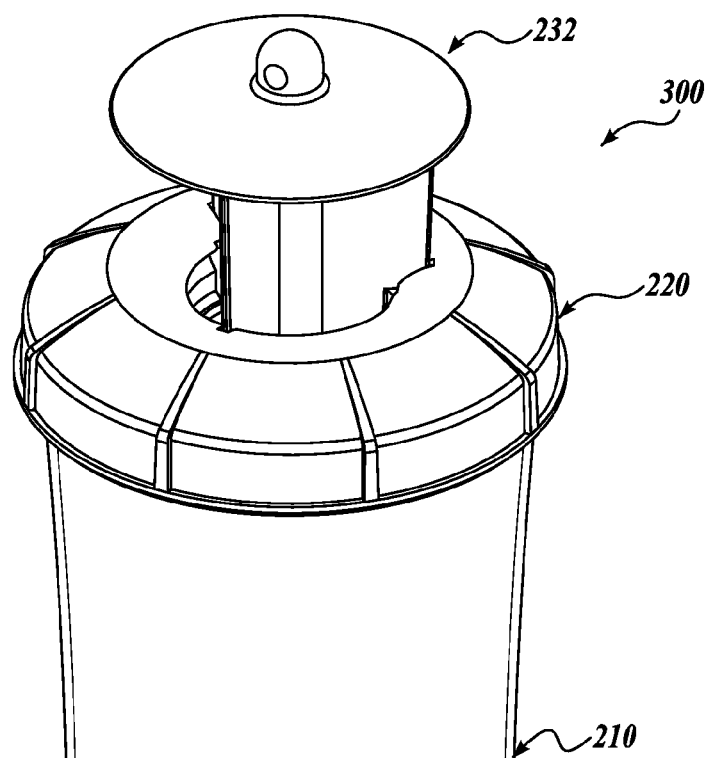
FIG. 8 is a perspective view of another embodiment of an insect trap in accordance with teachings herein, the insect trap having a single entrapment chamber and a separated attractant compartment.
Figure 8:
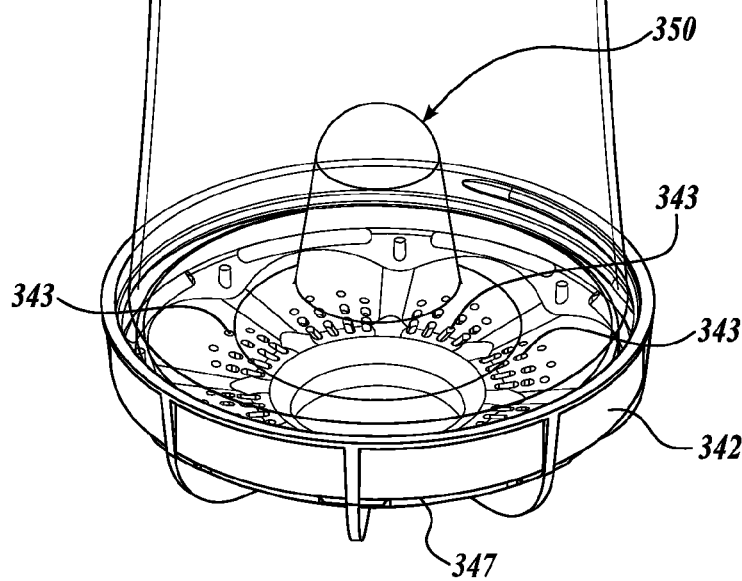
Figure 9:
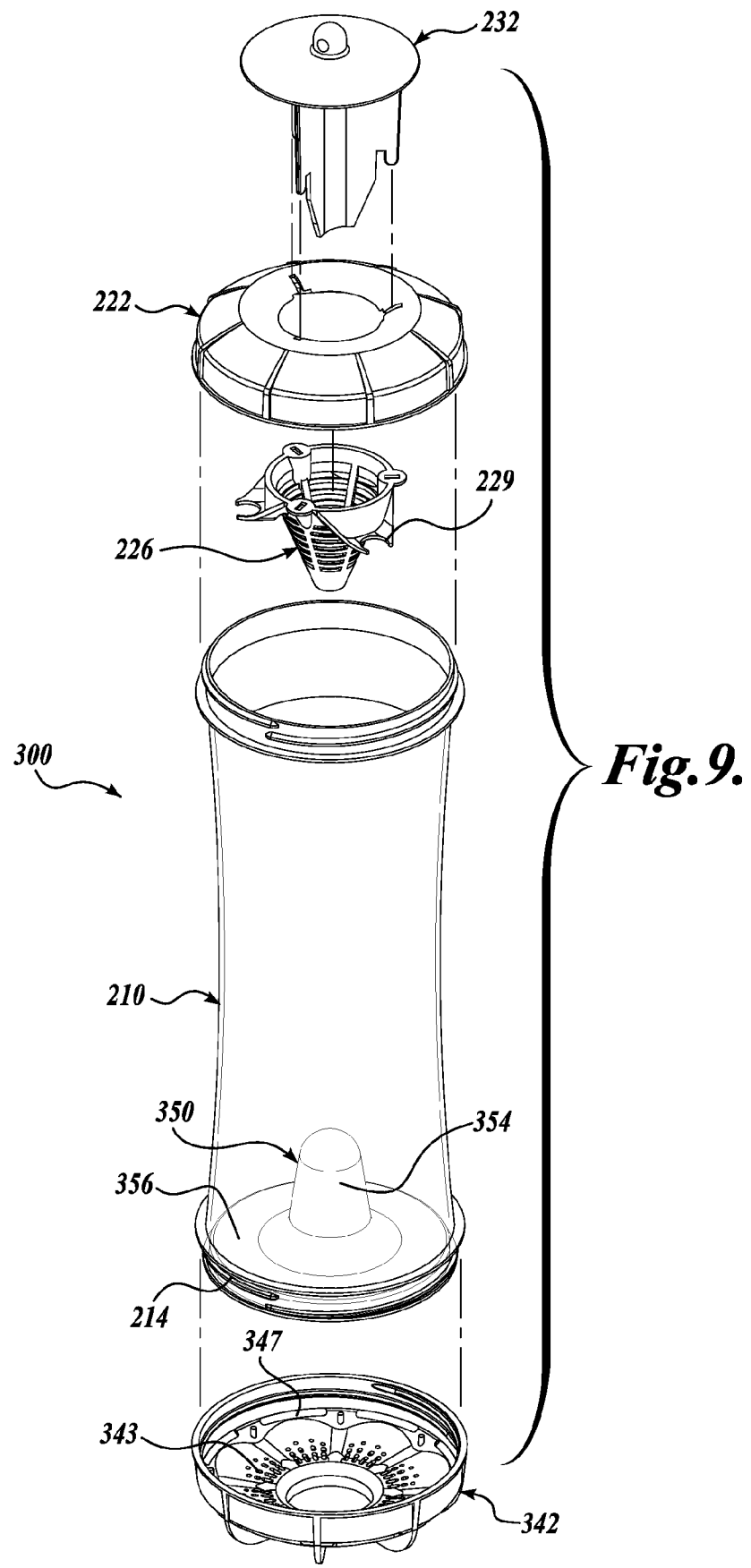
FIG. 9 is an exploded view of the insect trap shown in FIG. 8.
Figure 10:
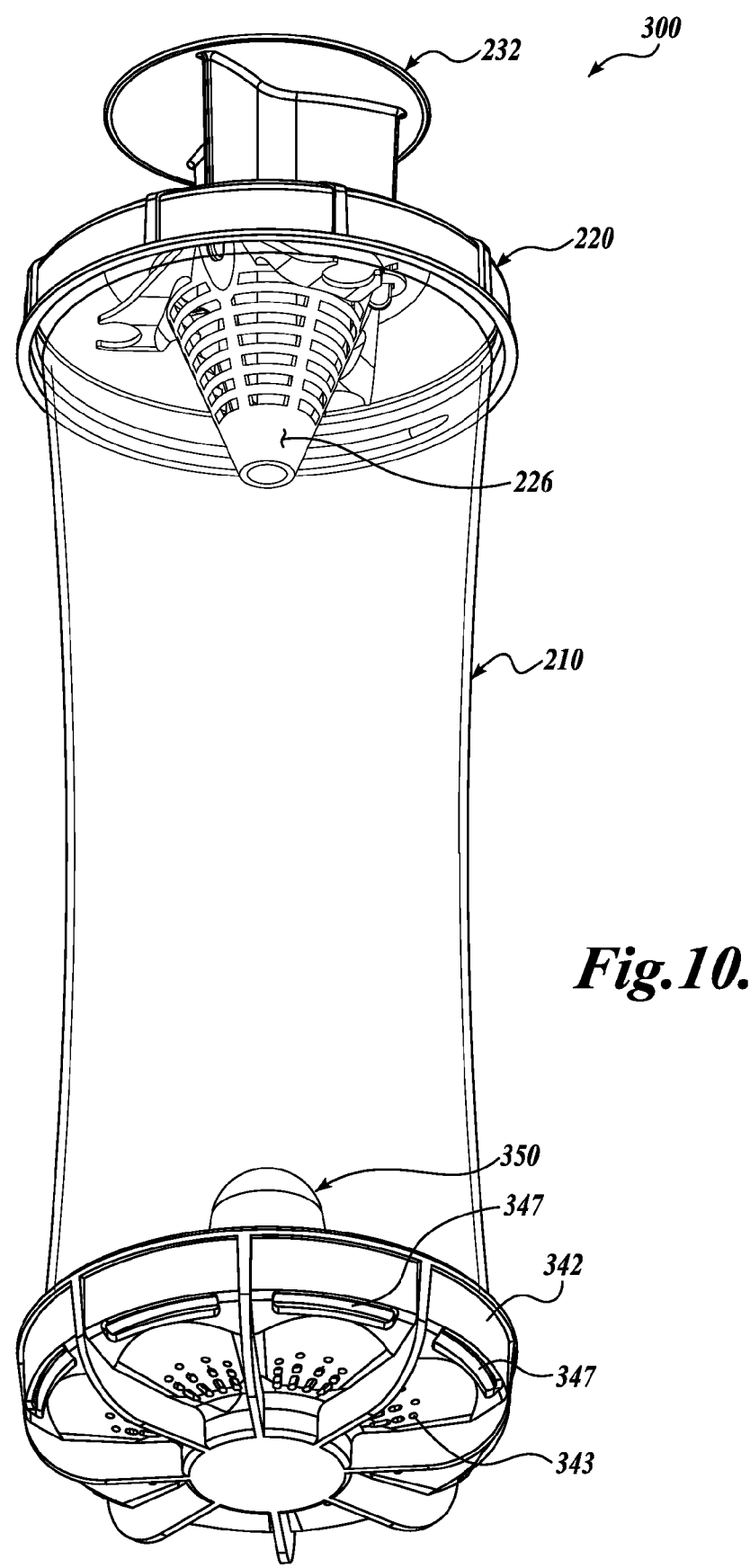
FIG. 10 is a perspective view of the insect trap shown in FIG. 8, showing a bottom portion of the trap.
Figure 11:
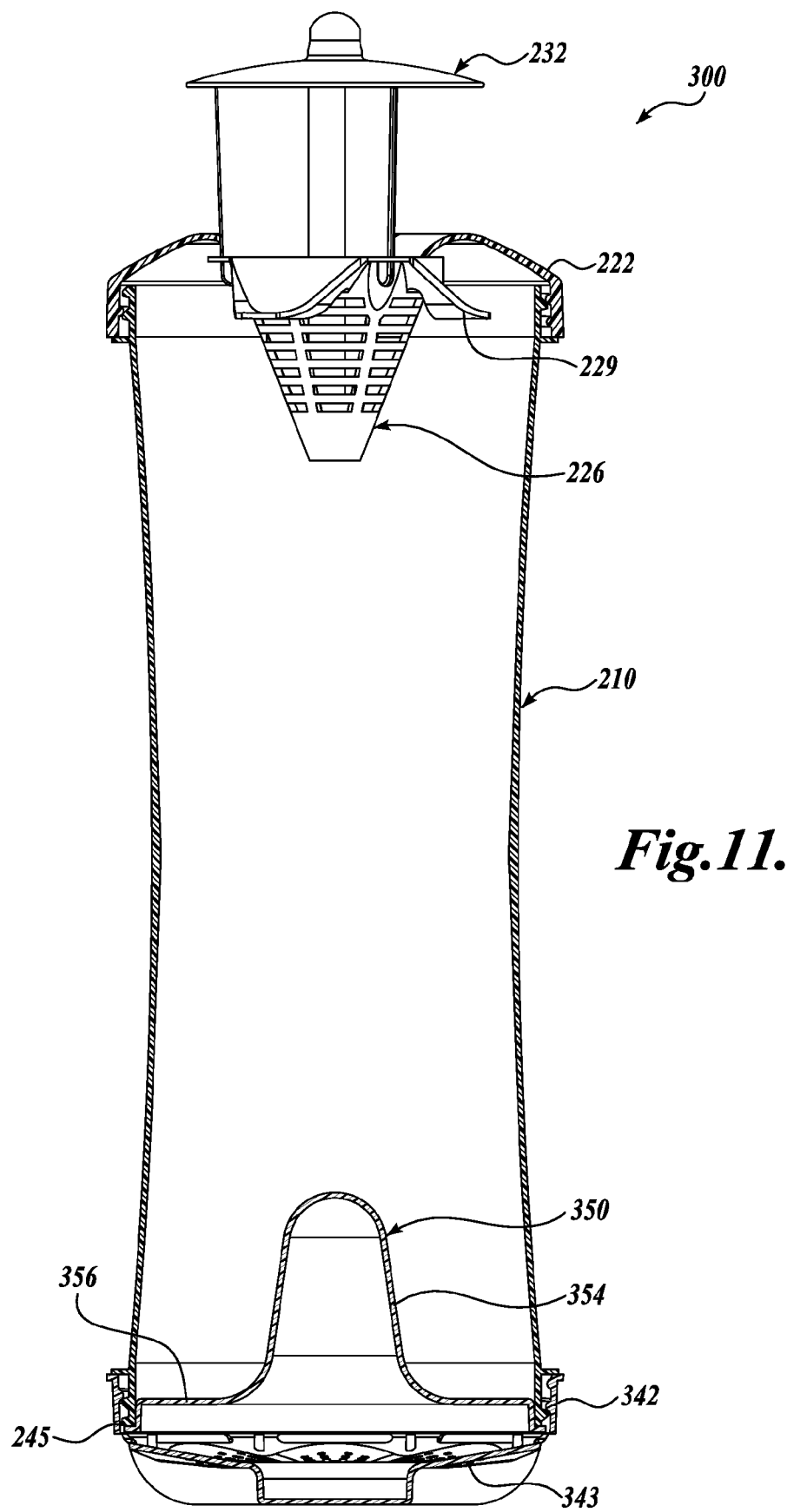
FIG. 11 is a cross-sectional side view of the insect trap shown in FIG. 8.

A perspective view of another embodiment of an insect trap 300 in accordance with the present invention is shown in FIG. 8, a partially exploded view is shown in FIG. 9, another perspective view is shown in FIG. 10, and a cross-sectional view is shown in FIG. 11. Many aspects of the embodiment are identical to the trap 200 described above, and shown in FIGS. 5-7. Similar numbers have been used to identify similar parts, the description of which will not be repeated here for clarity.

The insect trap 300 includes an entrapment chamber 210, a first entry structure 220, and an attachment fixture 232, substantially the same as described above. It is contemplated, that in an alternative embodiment two or more entry structures similar to the first entry structure 220 may be provided, for example, by forming the entrapment chamber 210 in a cruciform shape with additional portions extending from the sides.

A lower lid 342 is releasably attached to the second end 214 of the entrapment chamber 210. In this embodiment the lid 342 does not provide entryways for insects, but rather is designed to permit and encourage the production of a well-developed attractant plume that will attract insects toward the trap 300, such that the insects may then be enticed to enter the trap 300, e.g., through the first entry structure 220.

The lid 342 is provided with a plurality of small micropores or perforations 343 that are too small for the target insects to pass through, but that permit gaseous or vapor generated by an attractant to exit from the trap 300 through the perforations 343 to form a plume. The lid 342 includes peripheral apertures 347 that permit air flow through the associated portion of the trap 300, substantially similar to that described above.

An attractant compartment 350 is disposed substantially within the entrapment chamber 210 near the second end 214 of the entrapment chamber 210. The attractant compartment 350 preferably engages the second end 214 and may be affixed to the entrapment chamber 210, for example, with an adhesive or heat seal, by co-forming, or the like. The attractant compartment 350 is disposed generally over the lid 342, and is adapted to receive and retain an evaporative attractant (or attractant which is otherwise capable of combining with air to generate a plume). In the embodiment of the trap 300, the attractant plume exits the trap 300 through the perforations 343 and/or the peripheral apertures 347 in the lid 342. It will be appreciated that the peripheral apertures 347 encourage air flow through the attractant compartment 350 to facilitate generation of the plume. As discussed below, alternatively, or in addition, means may be provided wherein attractant retained in the attractant compartment 350 may enter the entrapment chamber 210 directly. In either case, insects may be lured to near proximity to the trap 300, and perhaps further enticed by curiosity to enter the trap 300 due to visual and auditory cues.

The attractant compartment 350 includes an inverted cup portion 354 and an annular flange portion 356. As seen most clearly in FIG. 11, the flange portion 356 abuts the second end 214 of the entrapment chamber 210. The cup portion 354 and annular flange portion 356 may be formed from a solid, non-porous material, for example, an injectable plastic, whereby the attractant in the inverted cup portion 354 will be substantially isolated from the interior of the entrapment chamber 210. As discussed above, the entry structure 220 in this embodiment also includes attractant holders 229 for retaining an attractant independent of the attractant compartment 350.

Alternatively, the cup portion 354 and annular flange portion 356 may be formed from a porous material, or otherwise provided with apertures, for example, micropores or perforations, such that the attractant retained therein can enter the entrapment chamber 210 directly therethrough, to combine and/or react therein with the attractant from the upper entry structure 220. It will be appreciated that the attractant material itself may be optionally provided with a non-porous cover over an upper surface, such that the trap 300 may be selectively used in either a mode wherein the attractant plume enters the entrapment chamber 210, or a mode wherein it is substantially blocked from entering the entrapment chamber. In this embodiment, the trap 300 allows a user to replace attractant in the attractant compartment 350 without opening access to the region in the entrapment chamber 210 containing trapped insects (e.g., by removing the lower lid 342 without removing the attractant compartment 350).

The choice of whether to form two separated attractant plumes with two entrapment chambers (e.g., with trap 100) or with a single entrapment chamber 210 (e.g., with the trap 200 or 300), or with one attractant plume and a separate repellent plume (e.g., with the trap 300), may depend on the particular application, for example, the particular attractants in use and the particular target species of insects. It may be desirable to use a repellent in the cup portion 354 that would tend to keep particular non-target species, such as beneficial insects, away from the trap 300, while using a different attractant retained by the entry structure 220 that tends to attract the target insect.

In either of the traps 200, 300 shown in the figures the trap allows for separated first and second attractant plumes (wherein the first plume may be antagonistic or repellent to an insect species that is targeted by the second plume), and thereby enables attraction of multiple insect species in an additive or even synergistic fashion. These traps provide a single entrapment chamber with plume separation, wherein the traps may have one or more insect entry structures.

While illustrative embodiments have been illustrated and described, it will be appreciated that various changes can be made therein without departing from the spirit and scope of the invention.

The embodiments of the invention in which an exclusive property or privilege is claimed are defined as follows:

1. An insect trap comprising:
   an entrapment chamber having an open first end and an open second end;
   a first entry structure removably attached to the first end of the entrapment chamber, the first entry structure including an upper lid having a large aperture, a small tapered guide disposed below the large aperture, and an attractant holder configured to retain a first insect attractant;
   a lower lid removably attached to the second end of the entrapment chamber, the lower lid including a means for retaining a second insect attractant, wherein the lower lid includes a plurality of apertures and wherein the lower lid is configured to retain a second insect attractant.

2. The insect trap of claim 1, wherein the first entry structure further comprises an attachment fixture comprising an upper cap having a plurality of panels that slidably engage the upper lid and are attached to the small tapered guide.

3. The insect trap of claim 1, wherein the attractant holder is co-formed with the small tapered guide.

4. The insect trap of claim 1, wherein the first entry structure comprises a hanging nib configured to receive a line for hanging the insect trap.

5. The insect trap of claim 1, wherein the lower lid comprises a central recess that is configured to retain the second insect attractant.

6. The insect trap of claim 5, wherein the lower lid further comprises a plurality of entry apertures that are sized to permit insect entry into the entrapment chamber, and further comprising a large tapered guide having an open proximal end disposed adjacent the lower lid and an open distal end disposed in the entrapment chamber.

7. The insect trap of claim 6, wherein the large tapered guide is shaped as a truncated cone.

8. The insect trap of claim 6, wherein the large tapered guide is transparent.

9. The insect trap of claim 5, wherein the lower lid further comprises a plurality of micropores, and further comprising an attractant compartment having an inverted cup portion and an outer flange portion.

10. The insect trap of claim 9, wherein the attractant compartment is formed from a nonporous material.

11. The insect trap of claim 10, wherein inverted cup portion is configured to partially enclose the second insect attractant retained by the lower lid.

12. The insect trap of claim 11, wherein the inverted cup portion is in fluid communication with the plurality of micropores such that a plume is formed by vapor from the second insect attractant that escapes through the micropores.

13. An insect trap for trapping flying insects comprising:
    a hollow entrapment chamber comprising a plastic tube having an open first end and an open second end;
    a first entry assembly comprising an annular lid having a central aperture, wherein the annular lid is removably attached to the first end of the entrapment chamber, and further comprising a first entry cone disposed below the annular lid, wherein the first entry cone is configured to retain a first attractant;
    a perforated lid removably attached to the second end of the entrapment chamber, the perforated lid having a plurality of apertures therethrough, wherein the perforated lid further includes a structure for retaining a second attractant;
    a first attractant retained by the first entry cone and a second attractant retained by the perforated lid, such that the first attractant forms a first plume that emanates from the first entry assembly and the second attractant forms a second plume that emanates from the perforated lid.

14. The insect trap of claim 13, wherein the first entry cone defines a plurality of C-shaped retainers.

15. The insect trap of claim 13, wherein the perforated lid defines a central recess that is configured to retain the second attractant.

16. The insect trap of claim 13, wherein the perforated lid defines a plurality of entry apertures that are sized to provide an entryway to the entrapment chamber for a target insect.

17. The insect trap of claim 16, further comprising a large entry cone having a large open end disposed adjacent the perforated lid and a small open end disposed in the entrapment chamber.

18. The insect trap of claim 13, wherein the plurality of apertures in the lower lid comprise micropores having a diameter of not more than one millimeter.

19. The insect trap of claim 18, further comprising an attractant compartment for retaining the second attractant, wherein the attractant compartment includes an inverted cup portion formed from a nonporous material.

20. The insect trap of claim 19, wherein the attractant compartment further comprises an annular flange that sealingly engages the attractant compartment.

* * * * *